(12) United States Patent
Dichter (10) Patent No.: US 7,398,518 B2
(45) Date of Patent: Jul. 8, 2008

(54) METHOD AND APPARATUS FOR MEASURING THREAD WAIT TIME

(75) Inventor: Carl R. Dichter, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 567 days.

(21) Appl. No.: 10/321,183

(22) Filed: Dec. 17, 2002

(65) Prior Publication Data

US 2004/0117796 A1      Jun. 17, 2004

(51) Int. Cl.
*G06F 9/45* (2006.01)
(52) U.S. Cl. .................................. 717/127
(58) Field of Classification Search ............... 717/127; 711/173; 718/102
See application file for complete search history.

(56) References Cited

U.S. PATENT DOCUMENTS

| | | | | |
|---|---|---|---|---|
| 6,233,599 | B1 * | 5/2001 | Nation et al. | 718/102 |
| 6,269,391 | B1 * | 7/2001 | Gillespie | 718/100 |
| 6,427,161 | B1 * | 7/2002 | LiVecchi | 718/102 |
| 6,438,671 | B1 * | 8/2002 | Doing et al. | 711/173 |
| 6,567,839 | B1 * | 5/2003 | Borkenhagen et al. | 718/103 |
| 6,842,898 | B1 * | 1/2005 | Carlson et al. | 718/100 |
| 2003/0114949 | A1 * | 6/2003 | Armstrong et al. | 700/107 |

* cited by examiner

*Primary Examiner*—John Chavis
(74) *Attorney, Agent, or Firm*—L. Cho (57) ABSTRACT

A method for analyzing a program includes identifying code in the program having high thread wait time. A task associated with the code is identified as a potential source of performance problem for the program.

34 Claims, 9 Drawing Sheets

METHOD AND APPARATUS FOR MEASURING THREAD WAIT TIME

FIELD

The present invention relates to performance analyzer tools that measure characteristics of programs. More specifically, the present invention relates to a method and apparatus for measuring wait time associated with threads in multi-threaded programs.

BACKGROUND

In computer programming, a thread is an instance of a sequence of code that operates as a unit on behalf of a single user, transaction, or message. Threads are sometimes described in terms of their weight, which describes how much contextual information must be saved for a given thread so that it can be referred by the system during the life of the thread.

A program that is split up into multiple threads is said to be multi-threaded. On a multi-processor system or in a system utilizing a processor that supports multi-threaded software, the multiple threads may be executed together in parallel. Each of the threads in the program may execute program code sequentially or may further be split up into child threads that may be executed in parallel. Threads have their own program counters and stacks. Similar to traditional processes, threads can be thought of as being in one of several states: running, blocked, ready, or terminated. A running thread has access to the processor and is active. A blocked thread is waiting for another thread to unblock it (e.g., on a semaphore). A ready thread is scheduled to run, but is waiting for the processor. A terminated thread is one that has exited.

Inactive threads are threads that are blocked or threads that are scheduled to run but are waiting for the processor. Current performance analyzer tools are unable to efficiently measure the wait time of inactive threads. These performance analyzer tools either do not have the capability to analyze threads that are not currently running or impose an intrusive protocol to measure the wait time of inactive threads which slows the program time to the point that real-time issues are less visible.

Thus, an effective and efficient method and apparatus for measuring thread wait time is desired.

BRIEF DESCRIPTION OF THE DRAWINGS

The features and advantages of the present invention are illustrated by way of example and are not intended to limit the scope of the present invention to the particular embodiments shown, and in which.

DETAILED DESCRIPTION

In the following description, for purposes of explanation, specific nomenclature is set forth to provide a thorough understanding of the present invention. However, it will be apparent to one skilled in the art that these specific details may not be required to practice the present invention. In other instances, well-known circuits and devices are shown in block diagram form to avoid obscuring the present invention unnecessarily.

Figure 1:
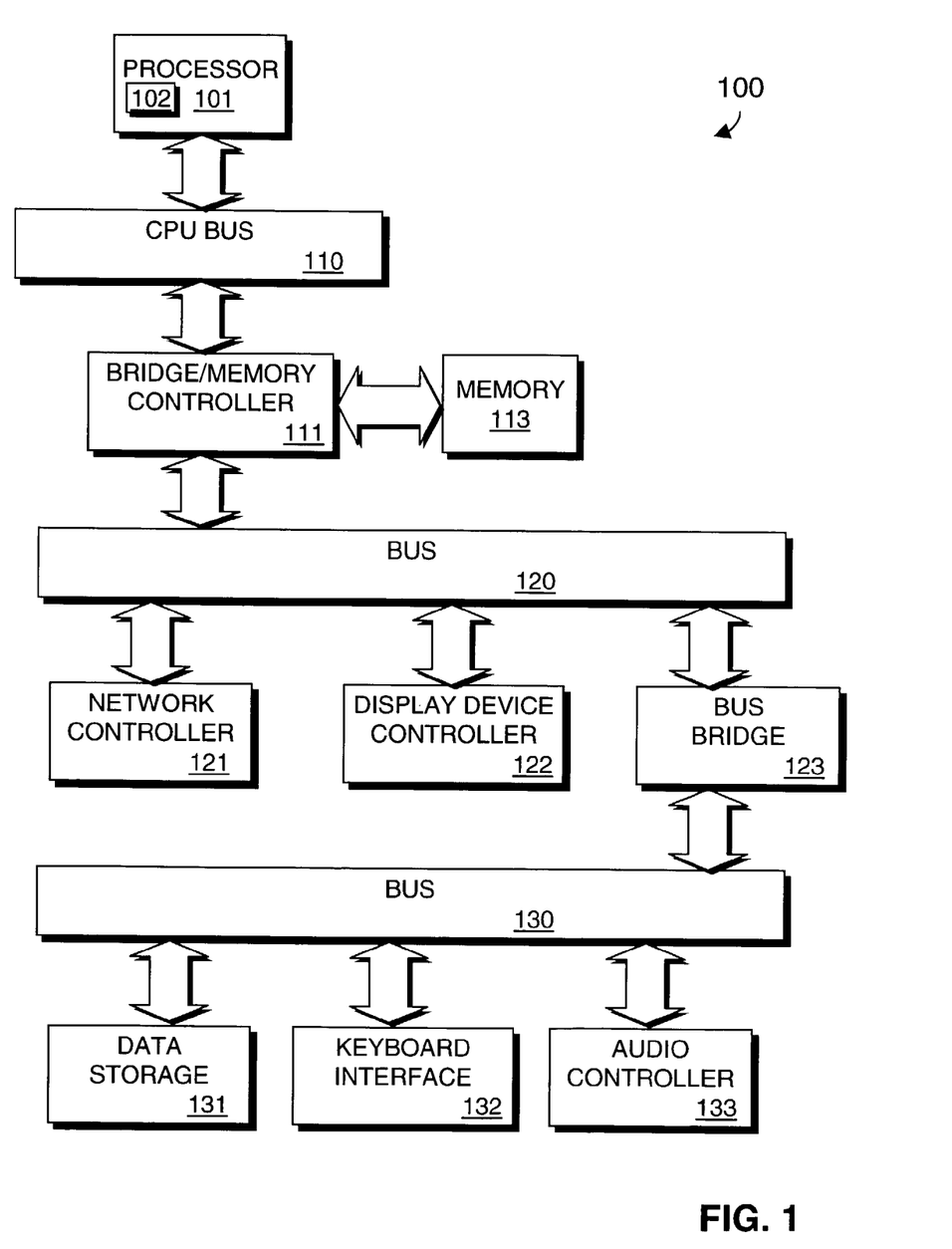
FIG. 1 is a block diagram of a computer system implementing an embodiment of the present invention.

FIG. 1 is a block diagram of a computer system 100 upon which an embodiment of the present invention can be implemented. The computer system 100 includes a processor 101 that processes data signals. The processor 101 may be a complex instruction set computer microprocessor, a reduced instruction set computing microprocessor, a very long instruction word microprocessor, a processor implementing a combination of instruction sets, or other processor device. FIG. 1 shows an example of the present invention implemented on a single processor computer system 100. However, it is understood that the present invention may be implemented in a computer system having multiple processors. The processor 101 is coupled to a CPU bus 110 that transmits data signals between processor 101 and other components in the computer system 100.

According to an embodiment of the computer system 100, the processor 101 is capable of executing a plurality of separate code streams or threads concurrently. In this embodiment, the processor 101 includes multiple logical processors (not shown), each of which may be individually halted, interrupted, or directed to execute a specified thread independently from other logical processors. The logical processors share execution resources of the processor core (not shown), which may include, for example, an execution engine, cache, system bus interface, and firmware. Each of the logical processors may execute a separate thread. Instructions from multiple threads may be executed concurrently using out-of-order instruction scheduling to efficiently utilize resources available during each clock cycle.

The computer system 100 includes a memory 113. The memory 113 may be a dynamic random access memory device, a static random access memory device, or other memory device. The memory 113 may store instructions and code represented by data signals that may be executed by the processor 101. A cache memory 102 resides inside processor 101 that stores data signals stored in memory 113. The cache 102 speeds up memory accesses by the processor 101 by taking advantage of its locality of access. In an alternate embodiment of the computer system 100, the cache 102 resides external to the processor 101.

A bridge memory controller 111 is coupled to the CPU bus 110 and the memory 113. The bridge memory controller 111 directs data signals between the processor 101, the memory 113, and other components in the computer system 100 and bridges the data signals between the CPU bus 110, the memory 113, and a first I/O bus 120.

The first I/O bus 120 may be a single bus or a combination of multiple buses. As an example, the first I/O bus 120 may comprise a Peripheral Component Interconnect (PCI) bus, a Personal Computer Memory Card International Association (PCMCIA) bus, a NuBus, or other buses. The first I/O bus 120 provides communication links between components in the computer system 100. A network controller 121 is coupled to the first I/O bus 120. The network controller 121 may link the computer system 100 to a network of computers (not shown in FIG. 1) and supports communication among the machines. A display device controller 122 is coupled to the first I/O bus 120. The display device controller 122 allows coupling of a display device (not shown) to the computer system 100 and acts as an interface between the display device and the computer system 100. The display device may be a television set, a computer monitor, a flat panel display or other display device. The display device receives data signals from the processor 101 through the display device controller 122 and displays the information and data signals to the user of the computer system 100.

A second I/O bus 130 may be a single bus or a combination of multiple buses. As an example, the second I/O bus 130 may comprise a PCI bus, a PCMCIA bus, a NuBus, an Industry Standard Architecture bus, or other buses. The second I/O bus 130 provides communication links between components in the computer system 100. A data storage device 131 is coupled to the second I/O bus 130. The data storage device 131 may be a hard disk drive, a floppy disk drive, a CD-ROM device, a flash memory device or other mass storage device. A keyboard interface 132 is coupled to the second 110 bus 130. The keyboard interface 132 may be a keyboard controller or other keyboard interface. The keyboard interface 132 may be a dedicated device or can reside in another device such as a bus controller or other controller. The keyboard interface 132 allows coupling of a keyboard to the computer system 100 and transmits data signals from a keyboard to the computer system 100. An audio controller 133 is coupled to the second I/O bus 130. The audio controller 133 operates to coordinate the recording and playing of sounds is also coupled to the I/O bus 130.

A bus bridge 123 couples the first I/O bus 120 to the second I/O bus 130. The bus bridge 123 operates to buffer and bridge data signals between the first I/O bus 120 and the second 1/0 bus 130.

The present invention is related to the use of the computer system 100 to analyze the performance of programs executed on the computer system 100. According to one embodiment, analyzing the performance of programs is performed by the computer system 100 in response to the processor 101 executing a sequence of instructions in main memory 113. Such instructions may be read into memory 113 from another computer-readable medium, such as data storage device 131, or from another source via the network controller 121. Execution of the sequence of instructions causes the processor 101 to analyze the performance of programs, as will be described hereafter. In an alternative embodiment, hardware circuitry may be used in place of or in combination with software instructions to implement the present invention. Thus, the present invention is not limited to any specific combination of hardware circuitry and software.

Figure 2:
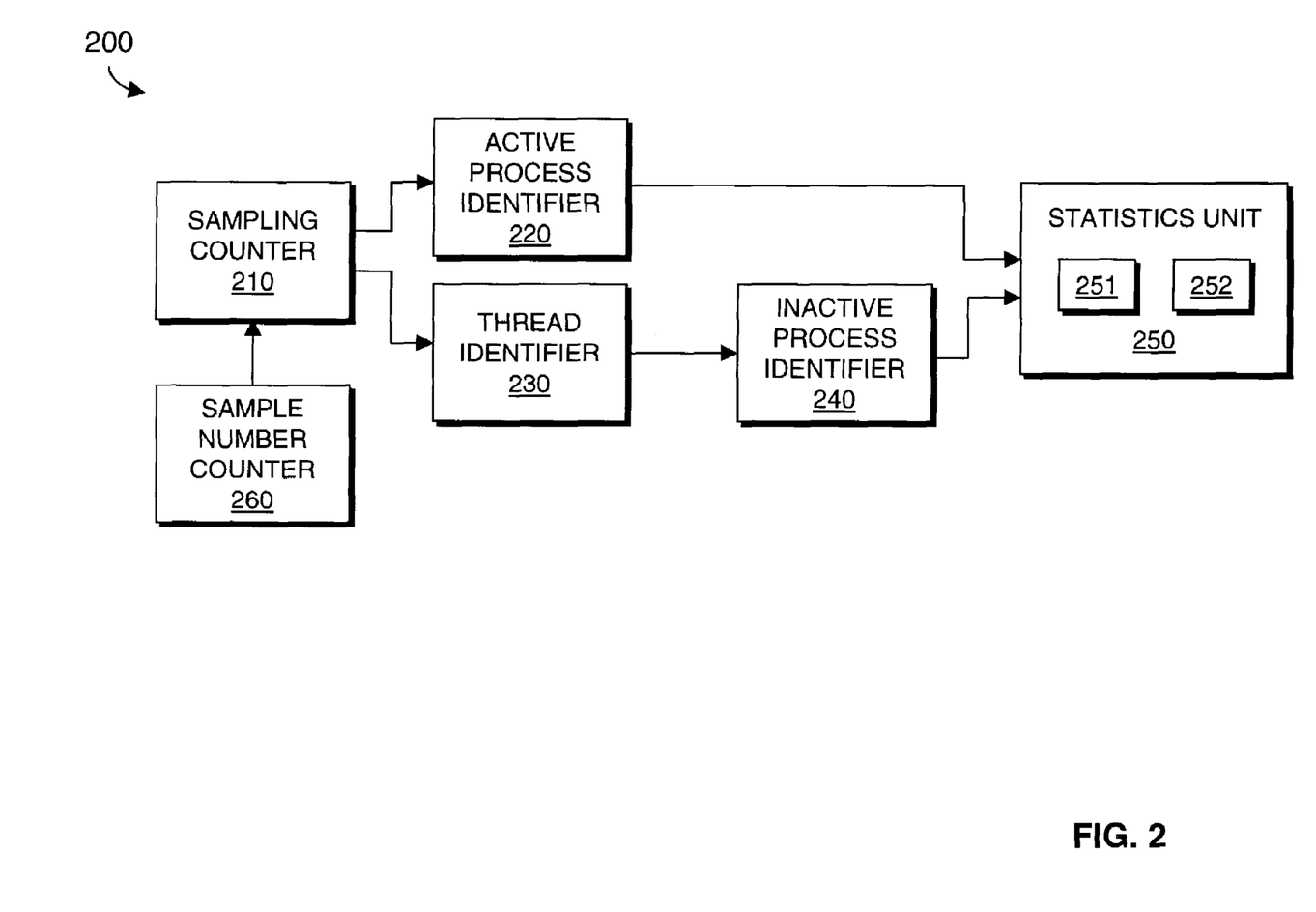
FIG. 2 is a block diagram of a program analyzer according to an embodiment of the present invention.

FIG. 2 is a block diagram illustrating modules implementing a program analyzer 200 that determines wait time of inactive threads according to an embodiment of the present invention. In an embodiment of the present invention, the modules are implemented in software and reside in main memory 113 (shown in FIG. 1) of the computer system 100 (shown in FIG. 1) as sequences of instructions. It should be appreciated that the modules may be implemented by hardware or a combination of both hardware and software. The program analyzer 200 includes a sampling counter 210. The sampling counter 210 operates to determine instances of time to perform sampling on a program executed by the computer system 100 (shown in FIG. 1). The sampling counter 210 may be incremented in response to time. Alternatively, the sampling counter 210 may be incremented in conjunction with a program counter of the processor 101 (shown in FIG. 1) or other counter or counters in the computer system 100. The sampling counter 210 may generate a signal indicating that a sampling counter threshold has been met to indicate that sampling of the program should occur.

The program analyzer 200 includes an active process identifier 220. The active process identifier 220 identifies code that is being executed by the processor 101 during an instance identified by the sampling counter 210. According to an embodiment of the program analyzer 200, the active process identifier 220 accesses a program counter (not shown) of the processor 101 that identifies a line of code in memory (shown in FIG. 113) that is being executed. It should be appreciated that the active process identifier may identify code that is being executed by the processor 101 utilizing other techniques.

Figure 3:
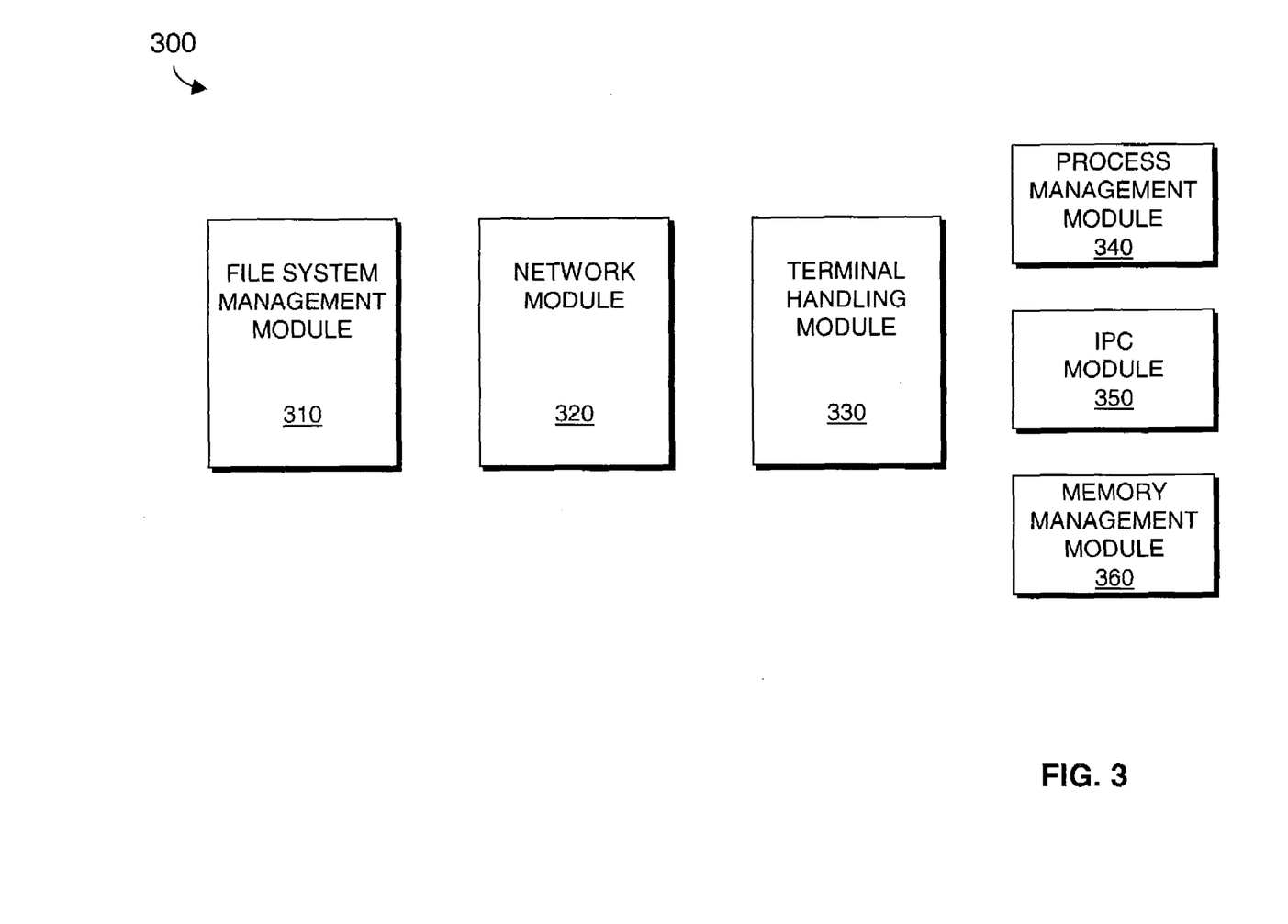
FIG. 3 is a block diagram illustrating an exemplary operating system that is accessed according to an embodiment of the present invention.

The program analyzer 200 includes a thread identifier 230. The thread identifier 230 identifies inactive threads that are being executed by the processor 101 during an instance identified by the sampling counter 210. An inactive thread may a "waiting thread" that is scheduled to run, but is waiting for the processor. Alternatively, an inactive thread may be a "suspended thread" that is blocked and is waiting for another thread to unblock it. It should be appreciated that an inactive thread may exhibit both of these characteristics or other characteristics. According to an embodiment of the program analyzer 200, the thread identifier 230 accesses an operating system of the computer system 100 to retrieve a thread identifier and stack location corresponding to the inactive threads. FIG. 3 illustrates an exemplary operating system 300 that is accessed according to an embodiment of the present invention. The operating system 300 includes a file system management module 310, network module 320, and terminal handling module 330 that may be used to implement system calls. The operating system 300 includes a process management module 340, inter-process communication module 350, and memory management module 360 that may be used to support basic capabilities of the computer system 100 (shown in FIG. 1). The thread identifier 230 (shown in FIG. 2) may access the process management module 340 using an application program interface (API). In response to the API, the process management module 340 may access a thread identifier and stack location corresponding to an inactive thread. It should be appreciated that the operating system 300 shown in FIG. 3 may represent any known operating system.

Figure 4:
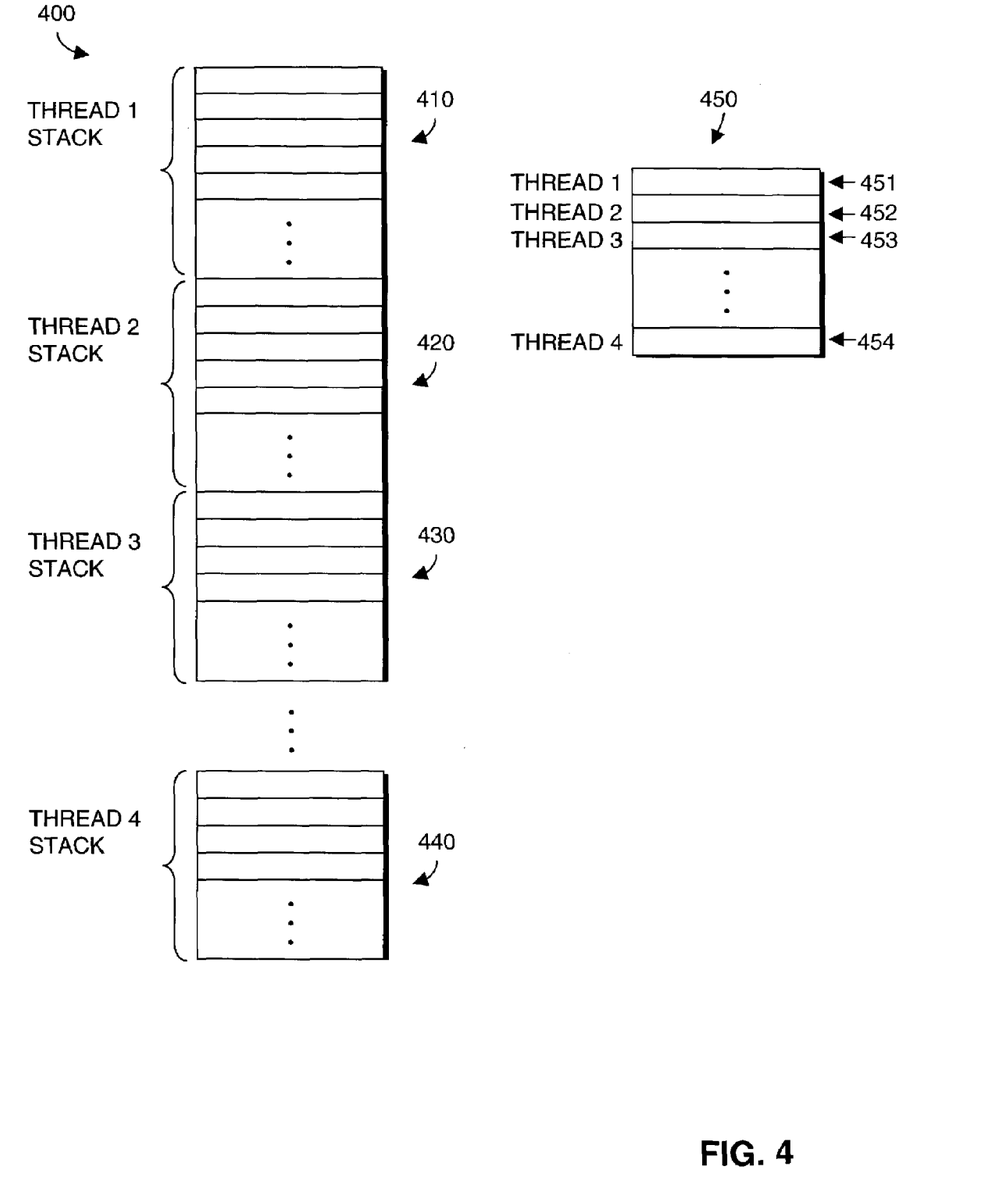
FIG. 4 is a block diagram illustrating exemplary locations in memory that are accessed according to an embodiment of the present invention.

FIG. 4 is a block diagram illustrating exemplary locations in memory 400 according to an embodiment of the present invention. The locations in memory 400 may be implemented in the memory 113 shown in FIG. 1. The locations in memory 400 include a plurality of locations utilized as stacks for threads executed by the processor 101. The stacks operate as data structures for storing information such as addresses, register values and other information used for supporting the execution of threads. A first location 410 may be utilized as a stack for a first thread, a second location 420 may be utilized as a stack for a second thread, a third location 430 may be utilized as a stack for a third thread, and a fourth location 440 may be utilized as a stack for an nth thread, where n may be any number.

The locations in memory 400 include a thread table 450 that includes a plurality of fields 451-454. Each of the fields may be designated for storing the address location of a stack of a thread. Field 451 may be used to store an address location of the stack for the first thread. Field 452 may be used to store an address location of the stack for the second thread. Field 453 may be used to store an address location of the stack for the third thread. Field 454 may be used to store an address location of the stack for the nth thread. It should be appreciated that other information may also be stored in the fields 451-454. For example, a thread identifier, status information such as whether the thread is running, blocked, ready, or terminated, and/or other information regarding the thread may be stored in the fields 451-454.

When a thread becomes inactive, the program counter of the thread is written into the thread's stack. The program counter operates as a return program counter that includes a return address in memory having code that is to be executed when the thread becomes active. The location of the stack and the status of the thread are written into the thread table 450. According to an embodiment of the present invention, a stack pointer that points to the program counter of the thread is stored on the thread table 450 when the thread becomes inactive. Thus, by accessing the stack pointer of the inactive thread from the thread table 450, the address of the return program counter or the return address of the thread may be retrieved. In alternate embodiments of the present invention, the location of the thread stacks stored on the thread table 450 may be a general stack location instead of the stack pointer. In this embodiment, the process management module 340 may be tasked with finding the return program counter using other techniques.

Referring back to FIG. 2, the program analyzer 200 includes an inactive process identifier 240. The inactive process identifier 240 receives a stack location corresponding to an inactive thread identified by the thread identifier 230. The inactive process identifier 240 retrieves a return program counter associated with the stack location. The return program counter identifies code that is to be executed when the thread becomes active. The stack location received may be a stack pointer or other general location information associated with the stack. The inactive process identifier 240 may also capture a location of the inactive thread utilizing the stack location. The inactive process identifier 240 may retrieve the return program counter with the assistance of the process management module 340 (shown in FIG. 3).

The program analyzer includes a statistics unit 250. The statistics unit 250 performs statistical analysis on the code identified by the active process identifier 220 and code identified by the inactive process identifier 240. The statistics unit 250 includes an active time processor 251. The active time processor 251 includes a summing unit (not shown) that calculates a number of instances that code has been identified by the active process identifier 220 during a sampling sequence. Code that has been identified more than a set number of times is designated as being a "hot spot" or a section in the program that is very active. The statistics unit 250 includes an inactive time processor 252. The inactive time processor 252 includes a summing unit (not shown) that calculates a number of instances that code has been identified by the inactive process identifier 240 during a sampling sequence. Code that has been identified more than a set number of times is designated as being a "cold spot" or a section in the program that is associated with inactivity. According to an embodiment of the inactive time processor 252, the summing unit calculates a number of instances that code has been identified by the inactive process identifier 240 with respect to each thread during the sample sequence. Code that has been identified more than a set number of times with respect to a thread is designated as being a "cold spot". The inactive time processor 252 may also analyze the instances that code has been identified with respect to whether inactivity was due to its associated thread being blocked versus being ready but waiting for the processor. In one embodiment, a thread may be specifically identified by a user. The status of the specified thread may be monitored to determine whether the thread has a "cold spot".

The program analyzer 200 includes a sample number counter 260. The sample number counter 260 operates to track a number of instances that have been included in the sampling sequence. When a threshold is met, the sampling counter 210 generates an indication that a sufficient number of samples of the program have been taken for the current sampling sequence.

Figure 5:
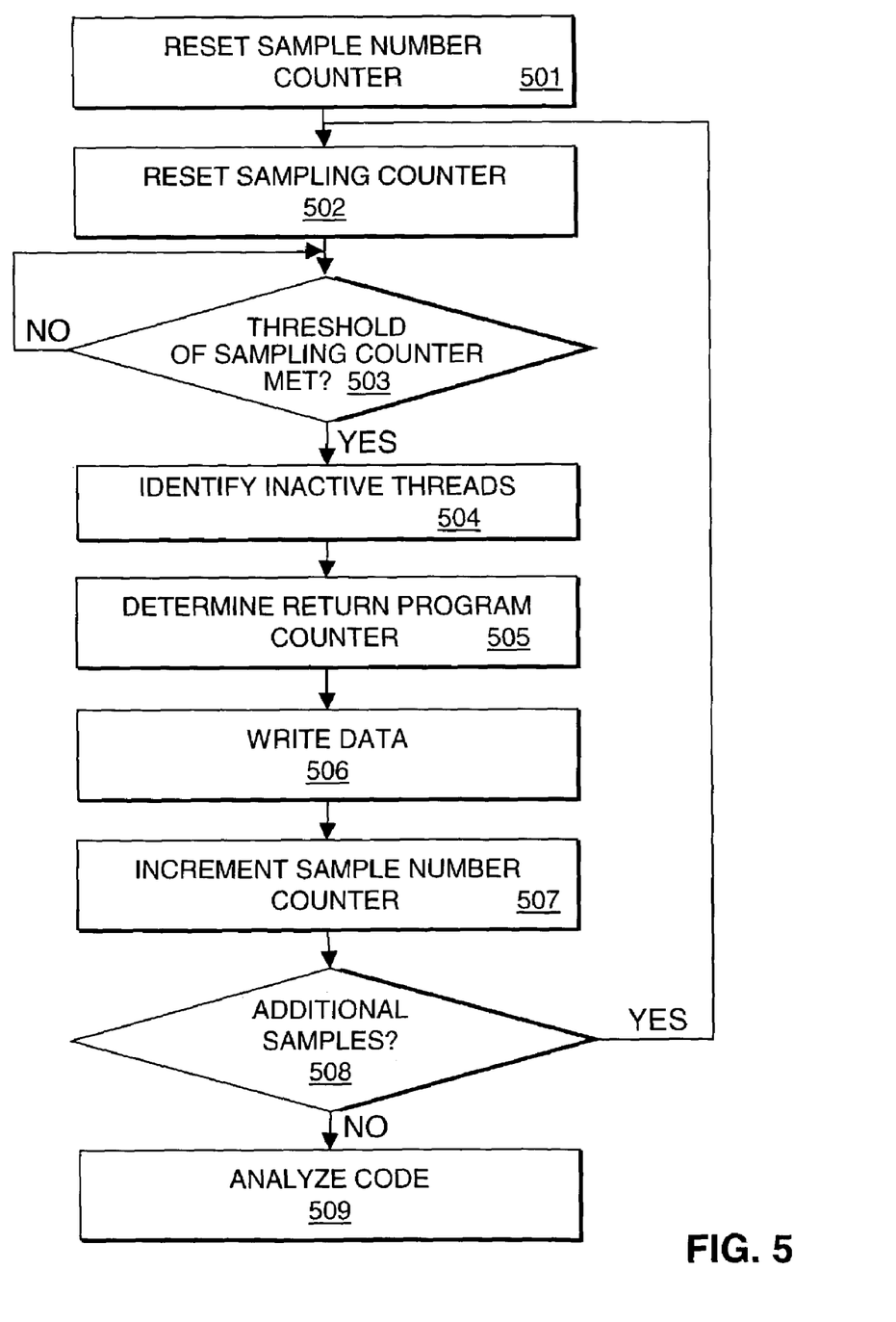
FIG. 5 is a flow chart illustrating a method for analyzing a program according to an embodiment of the present invention.

FIG. 5 is a flow chart illustrating a method for analyzing a program according to an embodiment of the present invention. At 501, a sample number counter is reset to zero. The sample number counter may be used to track a number of samples that are taken during a sampling sequence.

At 502, a sampling counter is reset to zero. The sampling counter may be used to determine instances when sampling of the program is performed. The sampling counter may be implemented using a counter that operates as a timer. Alternatively, the sampling counter may be implemented using a counter that operates in conjunction with a processor program counter or other counter or counters in a computer system.

At 503, it is determined whether the sampling counter threshold has been met. If the sampling counter threshold has been met, control proceeds to 504. If the sampling counter threshold has not been met, control returns to 503.

At 504, the identity of inactive threads are determined. According to an embodiment of the present invention, the identity of the inactive threads may be determined by accessing a thread table in memory that stores the status of threads running in the system. According to an alternate embodiment of the present invention, the identity of the inactive threads may be determined by instrumenting the operating system calls that control the threads. In this embodiment, instrumentation records the thread identifier, precise timestamp, and type of action. An analysis function could then determine the state of any thread at any given time.

At 505, return program counters associated with the inactive threads are determined. The return program counters identify return addresses of the code that will be executed by the threads when the threads becomes active. According to an embodiment of the present invention, the return program counters may be retrieved by accessing stack locations of the threads written on the thread table.

At 506, data related to the inactive threads including the inactive threads' thread identifier and return program counter are written to a file. Information regarding the threads' status, such as whether it is running, blocked, ready, or terminated, or other information may also be written to the file.

At 507, the sample number counter is incremented.

At 508, it is determined whether the sample number counter threshold has been met. If the sample number counter threshold has been met, then the sample sequence has a sufficient number of samples from the code and control proceeds to 509. If the sample number counter threshold has not been met, control proceeds to 502.

At 509, the data written to file is processed to identify code associated with high wait time. According to an embodiment of the present invention, a number of times each code is identified is determined. Code that has been identified more than a set number of times is designated as being a "cold spot" or a section in the program that is associated with inactivity. A number of times each code is identified with respect to a particular thread may also or alternatively be determined. Code that has been identified more than a set number of times with respect to a thread may be designated as being a "cold spot". The data may also be processed such that inactivity associated with blocking of a thread versus inactivity associated with a thread waiting for processor time may is distinguished.

Resource contention problems, improper threading, and use of unbuffered I/O are sources of performance problems in multi-threaded code. These problems serialize an application so that separate processors or logical processors are not free to run at the same time. These problems may be detected by utilizing the techniques of the present invention to find the functions/methods that spend the most wait time or those that have the greatest range of wait times for each time it is called.

The usefulness of the techniques of the present invention may be further highlighted with the following illustration. Consider the following code snippet.

```
id = getNextRequest(requester);                                              (1)
report = checkCache(id);        // See if we have the report in cache        (2)
if (report = NULL)                                                           (3)
    report = process(id);       //Create the credit report
writeResponse(requester, report); // Send report to requestor, write cache   (4)
```

When line 1 of the code is executed, the processor retrieves a request to find a report with a given "id". When line 2 of the code is executed, the processor determines whether a report having the id is in the cache. The cache is a single synchronized hash table. Thus, only one thread may either read from or write to the hash table at one time. When line 3 is executed, the processor creates the report if the report is not found in the cache. When line 4 is executed, the report is sent to the requester and a copy of the report is written into the cache.

Figure 6:
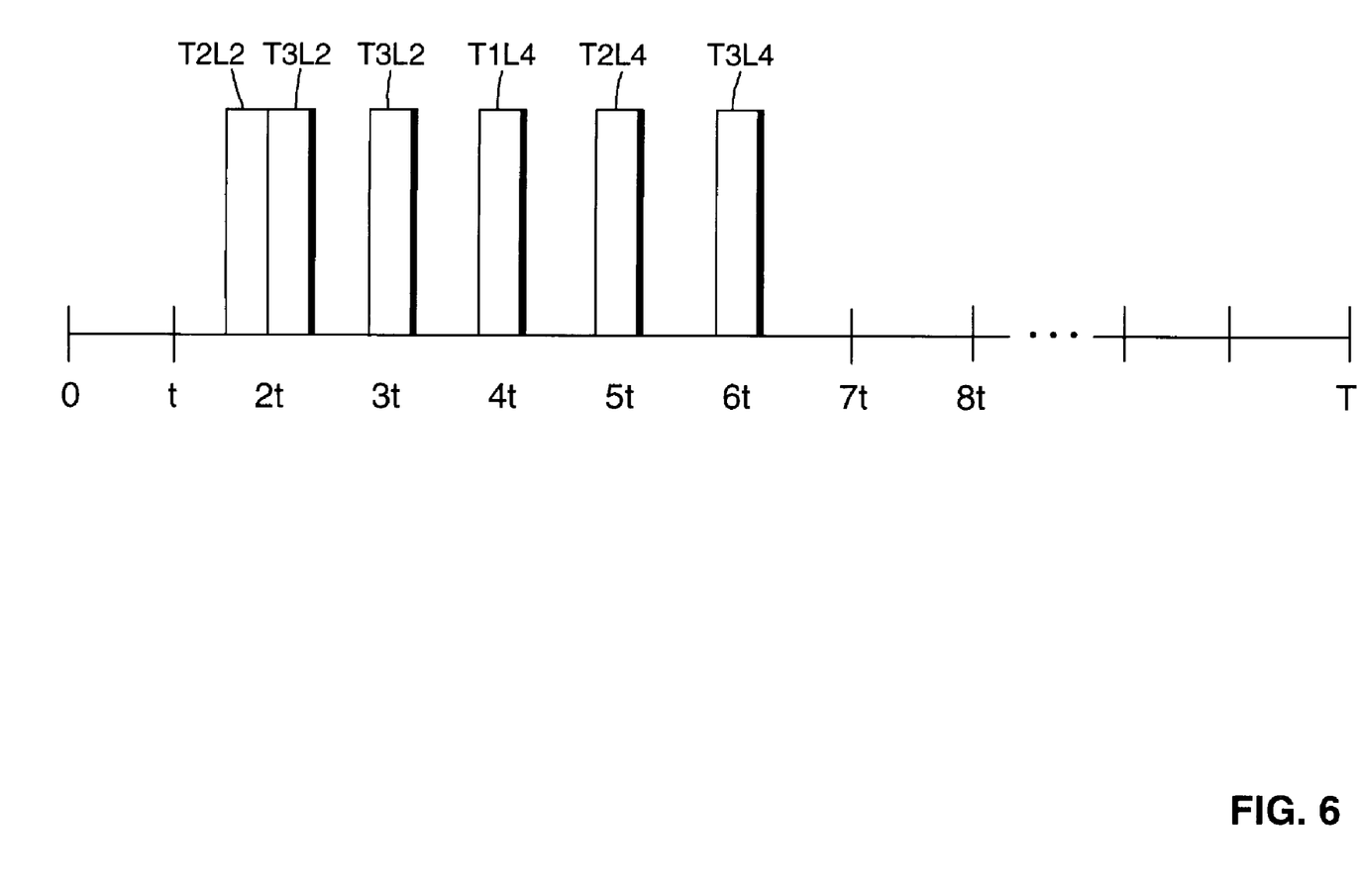
FIG. 6 illustrates an example of thread wait time sampling performed by an embodiment of the present invention.

Consider an example where three threads simultaneously attempt to execute lines 1-4 of the code snippet. In this example, the program analyzer 200 (shown in FIG. 2) analyzes the execution of the code snippet over a sampling sequence of a period T where the program is sampled every t seconds. FIG. 6 illustrates an example of thread wait time sampling performed by an embodiment of the present invention. At time t, threads 1-3 are all active. Threads 1-3 are executing line 1 of the code.

At time 2t, thread 1 is active and is executing line 2 of the code. Threads 2 and 3 are waiting to access the cache. Threads 2 and 3 are recorded as being inactive. The return counter for threads 2 and 3 point to line 2 of the code.

At time 3t, thread 1 is active and is executing line 3 of the code. Thread 2 is active and is executing line 2 of the code. Thread 3 is waiting to access the cache. Thread 3 is recorded as being inactive. The return counter for thread 3 points to line 2 of the code.

At time 4t, thread 1 is waiting to write the report to the cache. Thread 1 is recorded as being inactive. The return counter for thread 1 points to line 4 of the code. Thread 2 is executing line 3 of the code. Thread 3 is executing line 2 of the code.

At time 5t, thread 1 is executing line 4 of the code. Thread 2 is waiting to write the report to the cache. Thread 2 is recorded as being inactive. The return counter for thread 2 points to line 4 of the code. Thread 3 is executing line 3 of the code.

At time 6t, thread 2 is executing line 4 of the code. Thread 3 is waiting to write the report to cache. Thread 3 is recorded as being inactive. The return counter for thread 3 points to line 4 of the code.

At time 7t, thread 3 is executing line 4 of the code.

In this example, line 2 of the code was identified 3 times as being associated with an inactive thread, and line 4 of the code was identified 3 times as being associated with an inactive thread. Line 2 of the code corresponds with a function that checks a single synchronized hash table. Line 4 of the code corresponds with a function of sending a report to the requester and writing the report to the cache. By identifying these functions as areas in the code associated with inactivity, it may be realized by examining these functions that the reason for the inactivity may be due to the properties of the hash table. Once this problem has been diagnosed and isolated, it may be addressed. One possible method for addressing contention problems associated with a hash table is to split the hash table.

According to an embodiment of the present invention, the program analyzer 200 (shown in FIG. 2) generates a sampling sequence of the program over period T where T is a period of 20 seconds. In this embodiment, the program analyzer samples the program every t seconds where t is 10 milliseconds. It should be appreciated that the program analyzer 200 may be configured to generate sampling sequences over other period lengths and sample programs with a differing frequency.

Figure 7:
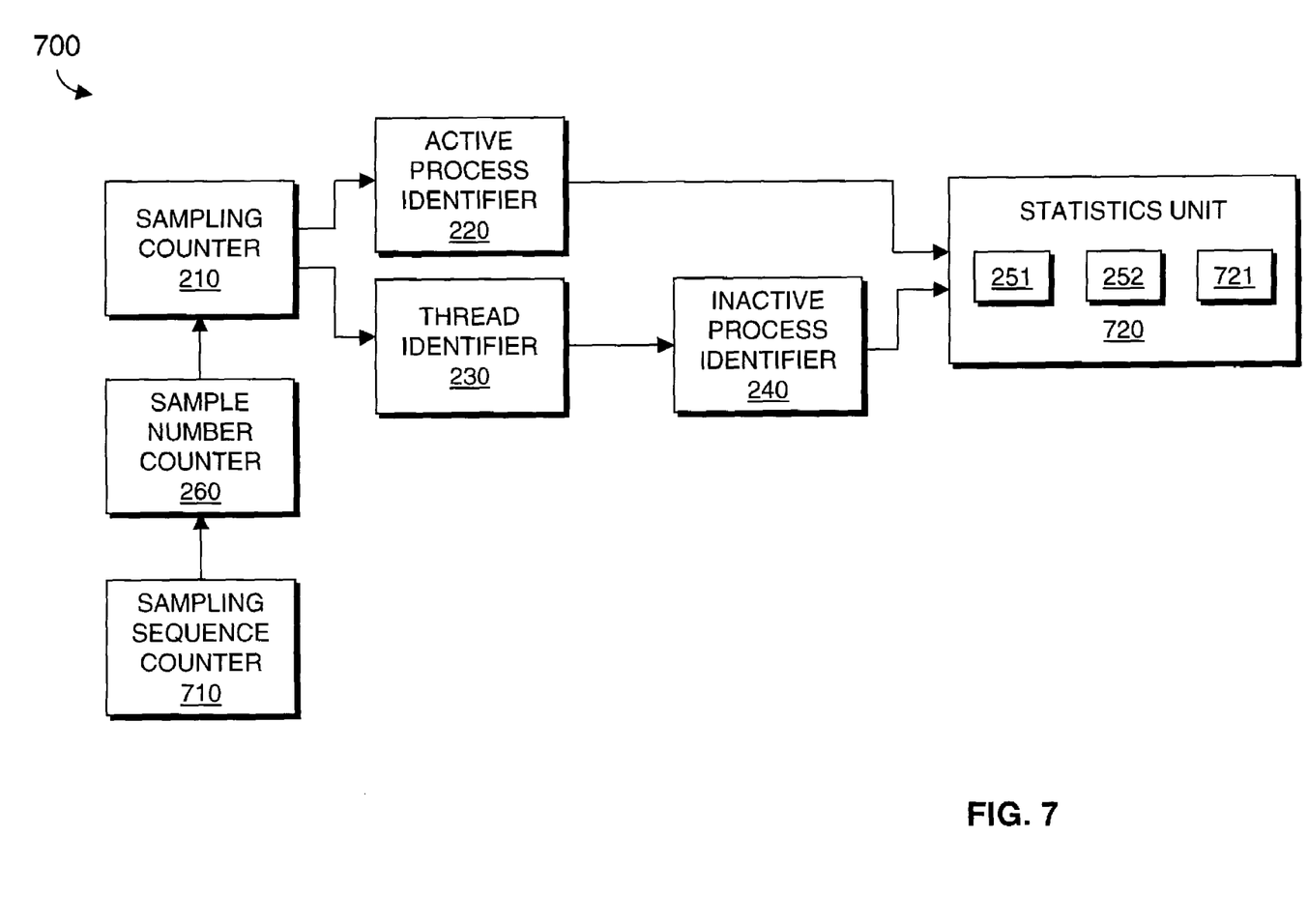
FIG. 7 is a block diagram of a program analyzer according to a second embodiment of the present invention.

FIG. 7 is a block diagram of a program analyzer 700 according to a second embodiment of the present invention. The program analyzer 700 includes components that are similar to the components described in the program analyzer 200 (shown in FIG. 2). The program analyzer 700 includes a sampling sequence counter 710. The sampling sequence counter 710 tracks a number of sampling sequences sampled by the program analyzer 700. When a threshold number of sampling sequences has been met, the sampling sequence counter 710 generates a signal indicating that a sufficient number of sampling sequences have been sampled.

The program analyzer 700 includes a statistics unit 720 that includes an inactive time variation processor 721. The inactive time variation processor 721 identifies code having a high variation in inactivity or thread wait time. The inactive time variation processor 721 includes a differencing unit (not shown). The differencing unit identifies a maximum and minimum number of times code has been identified by the inactive process identifier 240 during a sampling sequence. The maximum and minimum number of times code has been identified may be measured with respect to a particular thread or with respect to a sampling sequence in general. The differencing unit calculates the difference between the maximum and minimum values. The inactive time variation processor 721 includes a sorting unit (not shown). The sorting unit sorts the codes identified from an order of highest difference value to lowest difference value.

It should be appreciated that the inactive time variation processor 721 may include other components that implement other techniques for determining the variation in activity or thread wait time associated with the code identified by the inactive process identifier 240. For example, the inactive time variation processor 721 may include components to determine a standard of deviation of the number of instances that code has been identified during a sampling sequence by the inactive process identifier 240.

With a stable application and workload, the processor time for a function/method will change much less than the time of inactivity or wait time for the function/method that has contention problem. Thus, high variation of wait times may be used to identify threading problem areas. Identifying functions/methods with a high variation in wait time may be achieved by sampling the execution of the functions/methods over a period of time. Functions/methods with high variation in inactivity or wait time may be given a high priority for optimization.

According to an embodiment of the present invention, the program analyzer 700 generates several sampling sequences of the program each covering a period T where T is a period of 1 second. In this embodiment, the program analyzer samples the program every t seconds where t is 10 milliseconds. It should be appreciated that the program analyzer 200 may be configured to generate sampling sequences over other period lengths and sample programs with a differing frequency.

Figure 8:
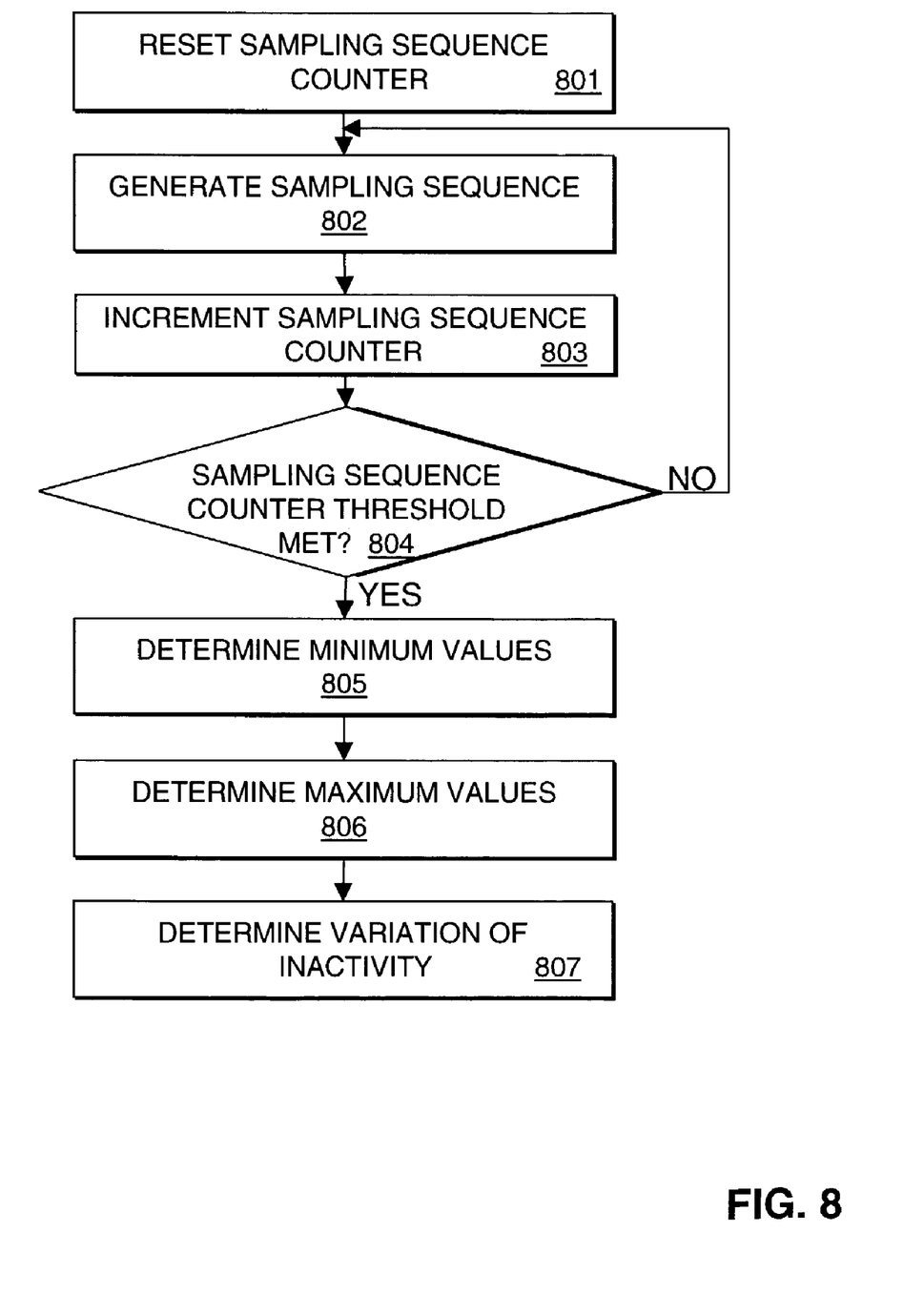
FIG. 8 is a flow chart illustrating a method for analyzing a program according to a second embodiment of the present invention.

FIG. 8 is a flow chart illustrating a method for analyzing a program according to a second embodiment of the present invention. At 801, a sampling sequence counter is reset to zero. The sampling sequence counter may be used to track a number of sampling sequences that are generated.

At 802, a sampling sequence is generated. According to an embodiment of the present invention, this may be achieved by performing the procedures described with reference to FIG. 5.

At 803, the sampling sequence counter is incremented.

At 804, it is determined whether the sampling sequence counter threshold has been met. If the sampling sequence counter has been met, a sufficient number of sampling sequences have been generated to analyze the variation in wait time. If the sampling sequence counter threshold has been met, control proceeds to 805. If the sampling sequence counter threshold has not been met, control proceeds to 802.

At 805, a minimum number of instances each code is identified over the sampling sequences is determined. According to an embodiment of the present invention, the minimum number of instances each code is identified over the sampling sequences is determined with respect to a thread.

At 806, a maximum number of instances each code is identified over the sampling sequences is determined. According to an embodiment of the present invention, the maximum number of instances each code is identified over the sampling sequences is determined with respect to a thread.

At 807, the variation between each corresponding minimum and maximum number is calculated in order to determine the variation of inactivity. The code identified may be ordered or prioritized according to their level of variation of inactivity.

The method for analyzing a program, according to an embodiment of the present invention, may also be described with the pseudo-code representation shown below.

```
While SamplingOverTime
Begin
    While in a sampling session
    Begin
        If SamplingCounterThresholdReached
        Begin
            Capture the program location of each thread
            Increment counter by location and thread
        End
    End
    Capture counters from the session
End
Analyze sessions, determine min/max of counters by locations & thread
Sort
```

Figures 9A, 9B:
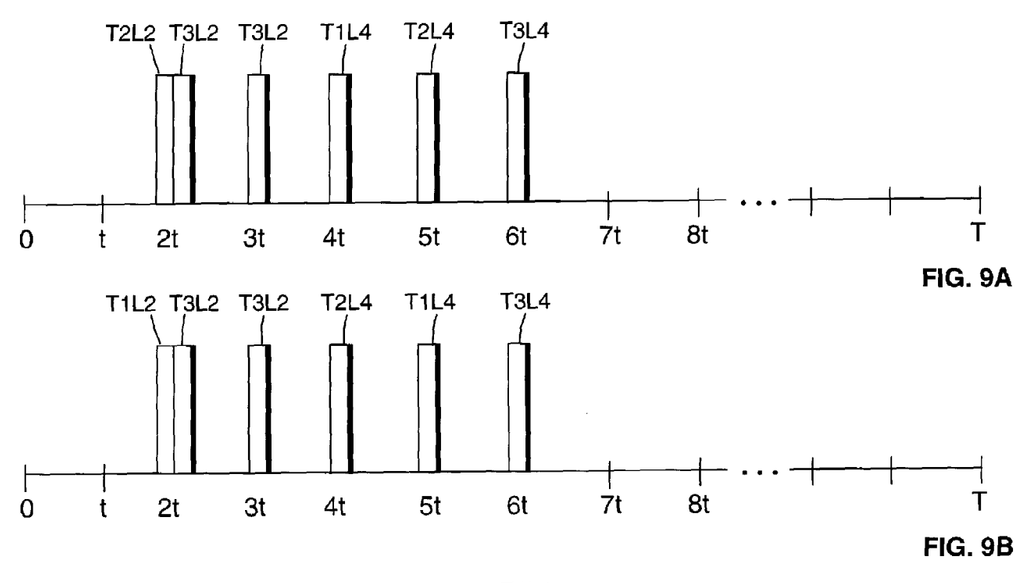
FIG. 9a illustrates an example of thread wait time sampling during a first sampling sequence according to an embodiment of the present invention.
FIG. 9b illustrates an example of thread wait time sampling during a second sampling sequence according to an embodiment of the present invention.

Consider again the example where three threads attempt to simultaneously execute lines 1-4 of the code snippet previously described. In this example, the program analyzer 700 (shown in FIG. 7) analyzes the execution of the code snippet over a plurality of sampling sequence each having a period T, where the program is sampled every t seconds. FIG. 9a illustrates an example of thread wait time sampling performed by an embodiment of the present invention during a first sampling sequence. At time t, threads 1-3 are all active. Threads 1-3 are executing line 1 of the code.

At time 2t, thread 1 is active and is executing line 2 of the code. Threads 2 and 3 are waiting to access the cache. Threads 2 and 3 are recorded as being inactive. The return counter for threads 2 and 3 point to line 2 of the code.

At time 3t, thread 1 is active and is executing line 3 of the code. Thread 2 is active and is executing line 2 of the code. Thread 3 is waiting to access the cache. Thread 3 is recorded as being inactive. The return counter for thread 3 points to line 2 of the code.

At time 4t, thread 1 is waiting to write the report to the cache. Thread 1 is record as being inactive. The return counter for thread 1 points to line 4 of the code. Thread 2 is executing line 3 of the code. Thread 3 is executing line 2 of the code.

At time 5t, thread 1 is executing line 4 of the code. Thread 2 is waiting to write the report to the cache. Thread 2 is recorded as being inactive. The return counter for thread 2 points to line 4 of the code. Thread 3 is executing line 3 of the code.

At time 6t, thread 2 is executing line 4 of the code. Thread 3 is waiting to write the report to cache. Thread 3 is recorded as being inactive. The return counter for thread 3 points to line 4 of the code.

At time 7t, thread 3 is executing line 4 of the code.

FIG. 9b illustrates an example of thread wait time sampling performed by an embodiment of the present invention during a second sampling sequence. At time t, threads 1-3 are all active. Threads 1-3 are executing line 1 of the code.

At time 2t, thread 2 is active and is executing line 2 of the code. Threads 1 and 3 are waiting to access the cache. Threads 2 and 3 are recorded as being inactive. The return counter for threads 1 and 3 point to line 2 of the code.

At time 3t, thread 2 is active and is executing line 3 of the code. Thread 1 is active and is executing line 2 of the code. Thread 3 is waiting to access the cache. Thread 3 is recorded as being inactive. The return counter for thread 3 points to line 2 of the code.

At time 4t, thread 2 is waiting to write the report to the cache. Thread 2 is record as being inactive. The return counter for thread 2 points to line 4 of the code. Thread 1 is executing line 3 of the code. Thread 3 is executing line 2 of the code.

At time 5t, thread 2 is executing line 4 of the code. Thread 1 is waiting to write the report to the cache. Thread 1 is recorded as being inactive. The return counter for thread 1 points to line 4 of the code. Thread 3 is executing line 3 of the code.

At time 6t, thread 1 is executing line 4 of the code. Thread 3 is waiting to write the report to cache. Thread 3 is recorded as being inactive. The return counter for thread 3 points to line 4 of the code.

At time 7t, thread 3 is executing line 4 of the code.

Figure 9C:
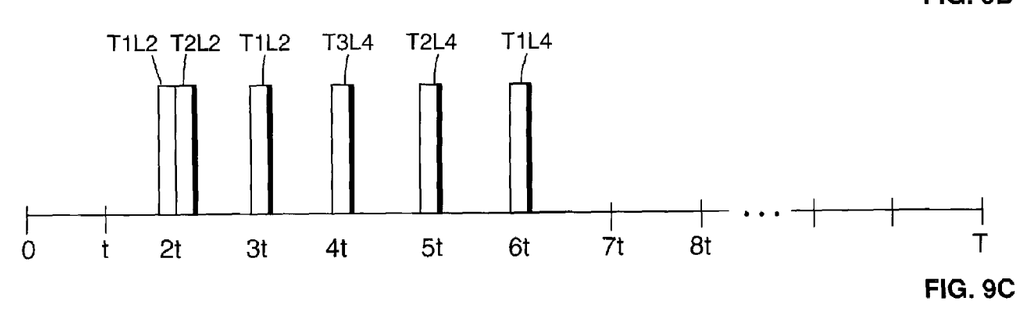
FIG. 9c illustrates an example of thread wait time sampling during a third sampling sequence according to an embodiment of the present invention.

FIG. 9c illustrates an example of thread wait time sampling performed by an embodiment of the present invention during a third sampling sequence. At time t, threads 1-3 are all active. Threads 1-3 are executing line 1 of the code.

At time 2t, thread 3 is active and is executing line 2 of the code. Threads 1 and 2 are waiting to access the cache. Threads 1 and 2 are recorded as being inactive. The return counter for threads 1 and 2 point to line 2 of the code.

At time 3t, thread 3 is active and is executing line 3 of the code. Thread 2 is active and is executing line 2 of the code. Thread 1 is waiting to access the cache. Thread 1 is recorded as being inactive. The return counter for thread 1 points to line 2 of the code.

At time 4t, thread 3 is waiting to write the report to the cache. Thread 3 is recorded as being inactive. The return counter for thread 3 points to line 4 of the code. Thread 2 is executing line 3 of the code. Thread 1 is executing line 2 of the code.

At time 5t, thread 3 is executing line 4 of the code. Thread 2 is waiting to write the report to the cache. Thread 2 is recorded as being inactive. The return counter for thread 2 points to line 4 of the code. Thread 1 is executing line 3 of the code.

At time 6t, thread 2 is executing line 4 of the code. Thread 1 is waiting to write the report to cache. Thread 3 is recorded as being inactive. The return counter for thread 3 points to line 4 of the code.

At time 7t, thread 1 is executing line 4 of the code.

In this example, with respect to thread 1, line 2 of the code was identified a total of 3 times and line 4 was identified a total of 3 times as being associated with the inactivity of the thread. Line 2 was identified a maximum number of 2 times during the third sampling sequence and a minimum number of 0 zero times during the first sampling sequence. Line 4 was identified 1 time during each of the three sampling sequences.

With respect to thread 2, line 2 of the code was identified a total of 2 times and line 4 was identified a total of 3 times as being associated with the inactivity of the thread. Line 2 was identified a maximum number of 1 time during the first and third sampling sequences and a minimum number of 0 zero times during the second sampling sequence. Line 4 was identified 1 time during each of the three sampling sequences.

With respect to thread 3, line 2 of the code was identified a total of 4 times and line 4 was identified a total of 3 times as being associated with the inactivity of the thread. Line 2 was identified a maximum number of 2 times during the first and second sampling sequences and a minimum number of 0 zero times during the third sampling sequence. Line 4 was identified 1 time during each of the three sampling sequences.

The line of code having the highest variation between maximum and minimum instances where the code is identified with respect to an inactive thread is line 2. Line 2 of the code corresponds with the checkCache function. The checkCache function has a higher variation in wait time because sometimes the function may have to wait behind other threads to access the hash table. By utilizing the techniques of the present invention, this function may be identified and may be given a high priority for optimization. As discussed earlier, one possible method for addressing contention problems associated with a hash table is to split the hash table.

It should be appreciated that the sampling counter 210, active process identifier 220, thread identifier 230, inactive process identifier 240, statistics unit 250 and 720, sample number counter 260, and sampling sequence counter 710 (shown in FIGS. 2 and 7) may be implemented using any known circuitry or technique.

FIGS. 5 and 8 are flow charts illustrating a methods for analyzing programs. Some of the procedures illustrated in the figures may be performed sequentially, in parallel or in an order other than that which is described. It should be appreciated that not all of the procedures described are required to be performed, that additional procedures may be added, and that some of the illustrated procedures may be substituted with other procedures.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for analyzing a program, comprising:
   identifying a thread that is inactive in the program;
   identifying a next line of code to be run when the thread becomes active;
   identifying a total number of times the next line of code is identified as being a next line of code to be run by threads identified as being inactive; and
   determining that the next line of code should be modified if the total number of times exceeds a set number of times.

2. The method of claim 1, wherein identifying the next line of code to be run when the thread becomes active comprises:
   retrieving a stack location corresponding to the thread; and
   retrieving a return program counter associated with the stack location.

3. The method of claim 2, further comprising capturing a location of the inactive thread.

4. The method of claim 2, wherein retrieving a stack location corresponding to the thread comprises retrieving a stack location of a waiting thread.

5. The method of claim 2, wherein retrieving a stack location corresponding to the thread comprises retrieving a stack location of a suspended thread.

6. The method of claim 2, wherein retrieving a stack location corresponding to the thread comprises retrieving a stack location of a waiting thread or a suspended thread.

7. The method of claim 1, wherein determining whether the next line of code should be modified comprises determining whether the thread is inactive due to it being blocked by another thread rather than it being inactive due to it waiting for a processor.

8. The method of claim 7, wherein determining whether the thread is inactive due to it being blocked by another thread rather than it being inactive due to it waiting for a processor comprises retrieving status information of the thread in a thread table.

9. The method of claim 1, further comprising modifying the next line of code that was identified.

10. A program analyzer, comprising:
    a thread identifier to identity a thread that is inactive in the program;

an inactive process identifier to identify a next line of code to be run in the thread when the thread becomes active; and a statistics unit to determine whether the thread is inactive due to the thread being blocked or due to the thread waiting for a processor and to write the status of the thread in a file.

11. The program analyzer of claim 10, wherein the thread identifier comprises an interface with an operating system to determine stack locations corresponding to the thread identified as being inactive.

12. The program analyzer of claim 10, wherein the inactive process identifier includes an interface with an operating system to retrieve return program counters corresponding to the thread identified as being inactive.

13. The program analyzer of claim 10, wherein the statistics unit includes a summing unit to sum a number of times a program code has been identified by the inactive process identifier over a period of time, wherein if the number of times exceeds a set number of times it is determined that the program code is associated with high thread wait time and should be modified to improve the program.

14. The program analyzer of claim 10, further comprising a counter to determine when the thread identifier identifies inactive threads.

15. The program analyzer of claim 10, wherein the statistics unit determines whether the next line of code should be modified to improve the program based upon a number of times the next line of code is identified as being a next line of code to be run by threads identified to be inactive.

16. The program analyzer of claim 10, wherein the statistics unit includes:
an inactive time processor to identify a number of instances the next line of code has been identified by the inactive processor identifier during each sampling sequence; and
an inactive time variation processor to determine if the next line of code has a high variation in a number of instances identified by the inactive process identifier during the sampling sequence.

17. The program analyzer of claim 10, wherein the statistic unit determines whether the thread is inactive due to it being blocked or due to it waiting for a processor by retrieving status information of the thread in a thread table.

18. A method for analyzing a program, comprising:
identifying a thread that is inactive in the program;
identifying a next line of code to be run in the thread when the thread becomes active; and
determining whether the thread is inactive due to the thread being blocked by another thread or whether the thread is inactive due to it waiting for a processor.

19. The method of claim 18, further comprising modifying the next line of code in response to determining that the thread is inactive due to it being blocked as oppose to it waiting for a processor.

20. The method of claim 18 further comprising determining whether the next line of code should be modified to improve the program.

21. The method of claim 20, wherein determining whether the next line of code should be modified comprises:
identifying a total number of times the next line of code is identified as being a next line of code to be run by threads identified as being inactive; and
determining that the next line of code should be modified if the total number of times exceeds a set number.

22. The method of claim 20, wherein determining whether the next line of code should be modified comprises determining that the thread is inactive due to it being blocked by another thread rather than it being inactive due to it waiting for a processor.

23. The method of claim 20, further comprising modifying the next line of code that was identified.

24. The method of claim 18, wherein identifying the next line of code to be run when the thread becomes active comprises:
retrieving a stack location corresponding to the thread; and
retrieving a return program counter associated with the stack location.

25. The method of claim 18, wherein determining whether the thread is inactive due to it being blocked by another thread or whether the thread is inactive due to it waiting for a processor comprises retrieving status information of the thread in a thread table.

26. A computer-readable medium having stored thereon sequences of instructions, the sequences of instructions including instructions which, when executed by a processor, causes the processor to perform:
identifying a thread that is inactive in a program;
identifying a next line of code to be run in the thread when the thread becomes active; and
determining whether the thread is inactive due to the thread being blocked by another thread or whether the thread is inactive due to it waiting for a processor.

27. The computer-readable medium of claim 26, further comprising instructions which, when executed by the processor, causes the processor to perform modifying the next line of code in response to determining that the thread is inactive due to it being blocked as oppose to it waiting for a processor.

28. The computer-readable medium of claim 26, further comprising instructions which, when executed by the processor, causes the processor to perform determining whether the next line of code should be modified to improve the program.

29. The computer-readable medium of claim 28, wherein determining whether the next line of code should be modified comprises:
identifying a total number of times the next line of code is identified as being a next line of code to be run by threads identified as being inactive; and
determining that the next line of code should be modified if the total number of times exceeds a set number.

30. The computer-readable medium of claim 28, wherein determining whether the next line of code should be modified comprises determining that the thread is inactive due to it being blocked by another thread rather than it being inactive due to it waiting for a processor.

31. The computer-readable medium of claim 28, further comprising instructions which, when executed by the processor, causes the processor to perform modifying the next line of code that was identified.

32. The method of claim 18, further comprising writing a status of the thread in a file.

33. The computer-readable medium of claim 26, wherein identifying the next line of code to be run when the thread becomes active comprises:
retrieving a stack location corresponding to the thread; and
retrieving a return program counter associated with the stack location.

34. The computer-readable medium of claim 26, further comprising instructions which, when executed by the processor, causes the processor to perform writing a status of the thread in a file.

* * * * *